United States Patent
McIlvain et al.

(10) Patent No.: US 9,384,108 B2
(45) Date of Patent: Jul. 5, 2016

(54) FUNCTIONAL BUILT-IN SELF TEST FOR A CHIP

(71) Applicant: International Business Machines Corporation, Armonk, NY (US)

(72) Inventors: Kevin M. McIlvain, Delmar, NY (US); Robert B. Tremaine, Stormville, NY (US); Gary Van Huben, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 634 days.

(21) Appl. No.: 13/693,236

(22) Filed: Dec. 4, 2012

(65) Prior Publication Data

US 2014/0156253 A1    Jun. 5, 2014

(51) Int. Cl.
  *G06F 9/455*    (2006.01)
  *G01R 31/28*    (2006.01)
  *G06F 11/00*    (2006.01)
  *G06F 11/27*    (2006.01)

(52) U.S. Cl.
  CPC ..................... *G06F 11/27* (2013.01)

(58) Field of Classification Search
  CPC ................ G01R 31/31724; G01R 31/3187; G06F 11/27
  USPC ....................... 714/733, 30; 703/23
  See application file for complete search history.

(56) References Cited

U.S. PATENT DOCUMENTS

| | | | |
|---|---|---|---|
| 5,590,071 A | 12/1996 | Kolor et al. | |
| 5,841,670 A * | 11/1998 | Swoboda | 703/23 |
| 6,470,417 B1 | 10/2002 | Kolor et al. | |
| 7,237,161 B2 * | 6/2007 | Volz | 714/724 |

(Continued)

FOREIGN PATENT DOCUMENTS

| | | |
|---|---|---|
| CN | 101706746 A | 5/2010 |
| EP | 1302777 A2 | 4/2003 |

(Continued)

OTHER PUBLICATIONS

Benoit Nadeau-Dostie, "Design for at-speed test, diagnosis and measurement", 1999, vol. 15. Springer Science & Business Media, pp. 1-239.*

(Continued)

*Primary Examiner* — Kamini S Shah
*Assistant Examiner* — Juan Ochoa
(74) *Attorney, Agent, or Firm* — Cantor Colburn LLP (57) ABSTRACT

According to one embodiment, a self-test system integrated on a chip is provided, the chip including a functional logic module for performing a selected application. The self-test system includes a primary interface a primary interface to the functional logic module, the primary interface configured to interface with a primary device, an input interface protocol generator for generating a pattern to be inserted into the primary interface and a secondary interface to the functional logic module, the secondary interface configured to interface with a secondary device. The system also includes an emulator engine coupled to the secondary interface, the emulator engine for testing a function of the functional logic module based on the inserted patterns, the function being configured to communicate with a secondary device coupled to the secondary interface, wherein the emulator engine tests the function when no secondary device is coupled to the chip.

20 Claims, 5 Drawing Sheets

(56) References Cited

U.S. PATENT DOCUMENTS

| | | |
|---|---|---|
| 7,519,886 B2 | 4/2009 | Tsao et al. |
| 7,656,726 B2 * | 2/2010 | Cheng et al. .................. 365/200 |
| 7,694,200 B2 * | 4/2010 | Forrest et al. ................. 714/733 |
| 7,890,828 B2 * | 2/2011 | Taylor et al. .................. 714/733 |
| 7,979,759 B2 | 7/2011 | Carnevale et al. |
| 8,020,132 B2 | 9/2011 | Norman |
| 2004/0006729 A1 * | 1/2004 | Pendurkar ...... G01R 31/318558 714/733 |
| 2006/0020442 A1 * | 1/2006 | Gedamu et al. .................. 703/28 |
| 2006/0031789 A1 * | 2/2006 | Gedamu et al. .................... 716/1 |
| 2007/0157059 A1 | 7/2007 | Tsao et al. |
| 2008/0016421 A1 | 1/2008 | McDevitt |
| 2011/0138241 A1 | 6/2011 | Taylor et al. |
| 2011/0214028 A1 * | 9/2011 | Whetsel ......... G01R 31/318555 714/733 |
| 2012/0036396 A1 | 2/2012 | Taylor et al. |

FOREIGN PATENT DOCUMENTS

| | | |
|---|---|---|
| JP | 2000267880 A | 9/2000 |
| JP | 2005061927 A | 3/2005 |

OTHER PUBLICATIONS

IBM, "Error injection method for ASICs," Mar. 7, 2005, IP.com No. IPCOM000097067D, pp. 1-9.

* cited by examiner

FUNCTIONAL BUILT-IN SELF TEST FOR A CHIP

BACKGROUND

The present invention relates to computer memory, and more specifically, to integrated functional built-in self test for a chip.

Integrated circuit operational speeds (i.e., signal frequencies) often outpace test equipment. Moreover, these chips often have complex internal state structures, such as significant embedded memory arrays.

In some cases chips are tested to ensure that certain bits in the chips are operating correctly. Chips may have interfaces to connect to peripheral devices that communicate with the chip. In some cases, the functionality of the interfaces to peripheral devices may not be tested until a peripheral device is actually coupled to the chip.

SUMMARY

According to one embodiment, a self-test system integrated on a chip is provided, the chip including a functional logic module for performing a selected application. The self-test system includes a primary interface a primary interface to the functional logic module, the primary interface configured to interface with a primary device, an input interface protocol generator for generating a pattern to be inserted into the primary interface and a secondary interface to the functional logic module, the secondary interface configured to interface with a secondary device. The system also includes an emulator engine coupled to the secondary interface, the emulator engine for testing a function of the functional logic module based on the inserted patterns, the function being configured to communicate with a secondary device coupled to the secondary interface, wherein the emulator engine tests the function when no secondary device is coupled to the chip. The system also includes an emulator checker in the emulator engine for determining that an input received by the emulator engine from the secondary interface is correct, the input generated by the functional logic module based on the inserted patterns, wherein the emulator engine generates an output to the functional logic module based on the input and the testing of the function based on the inserted patterns and an output interface protocol payload checker coupled to the primary interface for determining that a response received from the primary interface is correct by comparing the response to an expected result, the response provided by the functional logic module based on the output received at the secondary interface.

According to another embodiment, a method for self-testing a functional logic module on a chip is provided, the functional logic module for performing a selected application, the chip comprising a primary interface for the functional logic module, a secondary interface for the functional logic module, an input interface protocol generator coupled to the primary interface, an output interface protocol payload checker coupled to the primary interface and an emulator engine coupled to the secondary interface. The method includes generating, by the input interface protocol generator, patterns to be inserted into the primary interface, wherein the patterns are configured to test a function of the functional logic module that utilize the secondary interface, executing, by the functional logic module, the patterns inserted into the primary interface and receiving, by the emulator engine, an output from the secondary interface based on the inserted patterns executed by the functional logic module. The method also includes determining that the output received by the emulator engine from the secondary interface is correct, transmitting test communications from the emulator engine to the functional logic module via the secondary interface, the test communications being transmitted based on the output received by the emulator engine, the emulator engine allowing testing of the function when no secondary device is coupled to the secondary interface of the functional logic module, generating, by the functional logic module, a response based on the test communications received by the functional logic module, wherein the response is provided to the primary interface and determining, by the output interface protocol payload checker, that the response is correct by comparing the response to an expected result.

DETAILED DESCRIPTION

In an embodiment, a chip includes an integrated or on-chip Functional Built-In Self Test ("FBIST") mechanism for testing integrated circuits with internal memory state and complex transaction based interfaces. The interfaces include primary interfaces and secondary interfaces of a functional logic module. Such primary interfaces include, but are not limited to, system-on-chip applications, memory chip applications, and input/output ("IO") protocol adapter chips. The FBIST mechanism provides testing of functional logic in the chip that is used for communicating with coherency, memory (e.g., cache), calibration, and power management. In an embodiment, the functional logic being tested uses secondary interfaces in the chip to execute the associated functions.

In embodiments, the FBIST system provides an at-speed, stand-alone or in-system, self test capability for the chip being tested. This FBIST capability eliminates the need to use a separate bench-top tester for the target chip, thus enabling testing of the chip's functionality during fabrication and prior to assembly into a larger system. Accordingly, since the FBIST works at system speed, it is also possible to do design target speed functional testing of the chip while the chip is still on the die tester, identifying bad chips before they are assembled into a system. As a result, chips with fully functioning primary and secondary interfaces will be coupled to the next-level package modules to save production time and costs. In addition, the FBIST mechanism, once assembled into a system and in the field, can be integrated into the system diagnostic methodology to provide test coverage and fault isolation capabilities for the functions associated with primary and secondary interfaces of the chip.

In an embodiment, a primary device is any device capable of generating command streams for the functional logic in the chip under test. In one embodiment, a function using a primary interface is a slave or subservient to a primary device attached to the primary interface. In addition, a secondary device connected to a secondary interface is a slave to the functional logic on the chip when testing or executing a selected function. As discussed herein, slave devices are "passive" in a relationship with a device in that they wait for an "active" or "master" device to provide an input to take action or respond accordingly. In embodiments, for full-functional testing of a chip, secondary interfaces to these slave devices are evaluated by testing functions that communicate via the secondary interfaces. In embodiments, secondary devices are any suitable off-chip device, including but not limited to, off-chip dynamic random-access memory (DRAM), a Peripheral Component Interconnect Express (PCIe) interface, flash memory, a universal serial bus (USB) and sensors. In an embodiment, a slave device is a peripheral device to the functional logic module under test. The slave device is also responsive to the functional logic module under test. In embodiments, the slave-master device relationship entails a type of communication interface or protocol for exchanging command, control, address and data, and may also include a means of conveying error or status information to allow for recovery or isolation of potentially failing components.

In some cases, certain chips of a computing system are fabricated prior to other components of the system. Thus, it can be advantageous to test these chips to ensure they function properly without being attached to the other components that have yet to be produced, thus providing only good chips (i.e., those that pass) for assembly into a system or package. In one embodiment, memory controller chips with significant functionality are manufactured before RAM devices or processing chips are manufactured, where all of the components are assembled into a package. Accordingly, embodiments of the FBIST system and method allow for self-contained testing of memory controller chips without being coupled to primary or secondary devices, such as processing chips or RAM devices. In particular, the system and method allow for self-contained (i.e., without devices coupled to interfaces) testing of functions associated with communication and control of the devices coupled to primary and secondary interfaces of the memory controller. Therefore, a manufacturing process is improved by enabling evaluation and testing of chip functions to allow for replacement of faulty chips prior to assembly with other devices into a system or package.

In one embodiment, the FBIST mechanism generates functionally correct and coherent chip interface memory read/write commands to randomly or sequentially selected addresses of peripheral devices, such as RAM. An emulator engine coupled to the secondary interface of the chip simulates interaction with a secondary device to ensure testing of functions associated with the secondary interface. In an embodiment, the FBIST mechanism writes randomly generated or pattern based data packets, keeps track of the randomly generated or pattern based data packets, and reads response data back for comparison and evaluation of the chip's performance. In an embodiment, the integrated FBIST mechanism can perform all these tasks with the functional logic working at system speed. In one embodiment, the integrated FBIST mechanism can perform all these tasks with the functional logic working at a maximum operation frequency for a functional logic module being tested. Accordingly, with the FBIST system running at the same frequency as the functional logic under test and being physically on the same chip, the FBIST will scale accordingly with technology, process, temperature and voltage. Thus, the testing mechanism is not dependent on procuring external test equipment or pattern generators with matching frequency support. In addition, by running at system speed the FBIST will identify alternating current (AC) defects and timing closure misses, which may not be identified by traditional test equipment, such as external test pattern generation devices, due to a need for the equipment to run at a slower frequency. In an embodiment with an update to a chip using new technology that provides a frequency increase, the FBIST mechanism scales to the new frequency to provide testing of the functions without having to acquire new test equipment to run at the increased frequency.

Embodiments include a self-test system integrated on a chip where the self-testing allows testing of functionality and interfaces for both primary and secondary devices without being coupled to primary or secondary devices. In an embodiment, the FBIST is integrated in a chip including a functional logic module for performing a selected application. The chip may be any suitable chip with logic to be tested, such as a memory controller with a memory buffer and on-board cache. The logic under test may be a functional logic module for performing a selected application. The chip includes a primary interface configured to interface with a primary device, such as a processing unit. The FBIST system includes an input interface protocol generator and output interface payload checker for use in testing the primary interface. The input interface protocol generator is configured to generate a pattern to be inserted into the primary interface. The FBIST system also includes a secondary interface configured to interface with secondary devices, such as random access memory (RAM). In an embodiment, an emulator engine tests a secondary interface function based on the inserted patterns. In embodiments, an emulator checker in the emulator engine determines if traffic received by the emulator engine from the secondary interface is correct. As discussed herein, traffic includes communications such as data, signals, addresses, commands or other suitable communications for operations of functional logic with respect to primary and secondary devices.

In an embodiment, the primary interface emulator supports up to 32 parallel command streams. Each command stream is configured via registers accessed by the user interface. The secondary interface also contains a set of programmable registers configured via the user interface. The configuration of the secondary interface emulator determines the function of the emulator in response to certain patterns on the secondary interface. In the embodiment, a read command generated by the primary interface emulator will be associated with a particular command stream and have an associated command tag which is part of the pattern generated by the primary interface emulator. The read command is marked with this tag as it travels all the way through the primary interface logic and on to the secondary interface. When the secondary interface receives the command and associated tag, the command will be checked for correctness and the tag will be used to determine a data pattern that should be generated for the read response. In the embodiment, the write command also has a command tag associated with it. However, the tag does not traverse through the logic with the write command as it does with the read command. Therefore, the write command tag is encoded into a configurable location within the write data generated by the primary interface emulator. The secondary interface emulator decodes the tag from the configurable location in write data and uses this tag as a reference into the configurable registers to determine what the expected pattern is. This information will be used to check the write data for errors. All errors will be recorded and error information control signals will communicate the error status information to the primary interface emulator which contains the main FBIST test control logic. The secondary interface function is used to communicate with a secondary device coupled to the secondary interface, where the emulator engine tests the function when no secondary device is coupled to the chip, thus providing a self-contained test of chip functionality. In addition, the output interface protocol payload checker determines whether a response generated by the primary interface and resulting from execution of the inserted patterns is correct by comparing the response to an expected result. In embodiments, the payload checker forms expected results by communication with the input interface protocol generator, including the commands, data and address traffic generated.

In an embodiment of the FBIST system, an input interface protocol generator generates a plurality of commands from the primary interface. A functional logic module for performing a selected application in the chip receives the plurality of commands. The functional logic module arbitrates placement of each of the plurality of commands and executes each of the plurality of commands in parallel. Then the output interface protocol payload checker determines whether a response based on the execution of the commands is correct by checking communication from the functional logic module to the primary interface. As compared to self-contained test systems that bypass all internal controllers on the chip to test attached memory (e.g., RAM), embodiments of the FBIST system are integrated with an on-board self-test engines capable of exercising on-chip functions and testing the logic completely via commands and responses communicated through primary and secondary interfaces.

In embodiments a single chip may include a plurality of functional logic modules to be tested, where each function logic module performs a separate application with different functions. In such an embodiment, each functional logic module has its own FBIST system described herein. Examples of functional logic modules that may be tested include a processor, cache hierarchy, memory sub-system and I/O sub-system. In an embodiment, each of the functional logic modules on a single chip have primary and secondary interfaces that are tested by systems and methods described herein.

Figure 1:
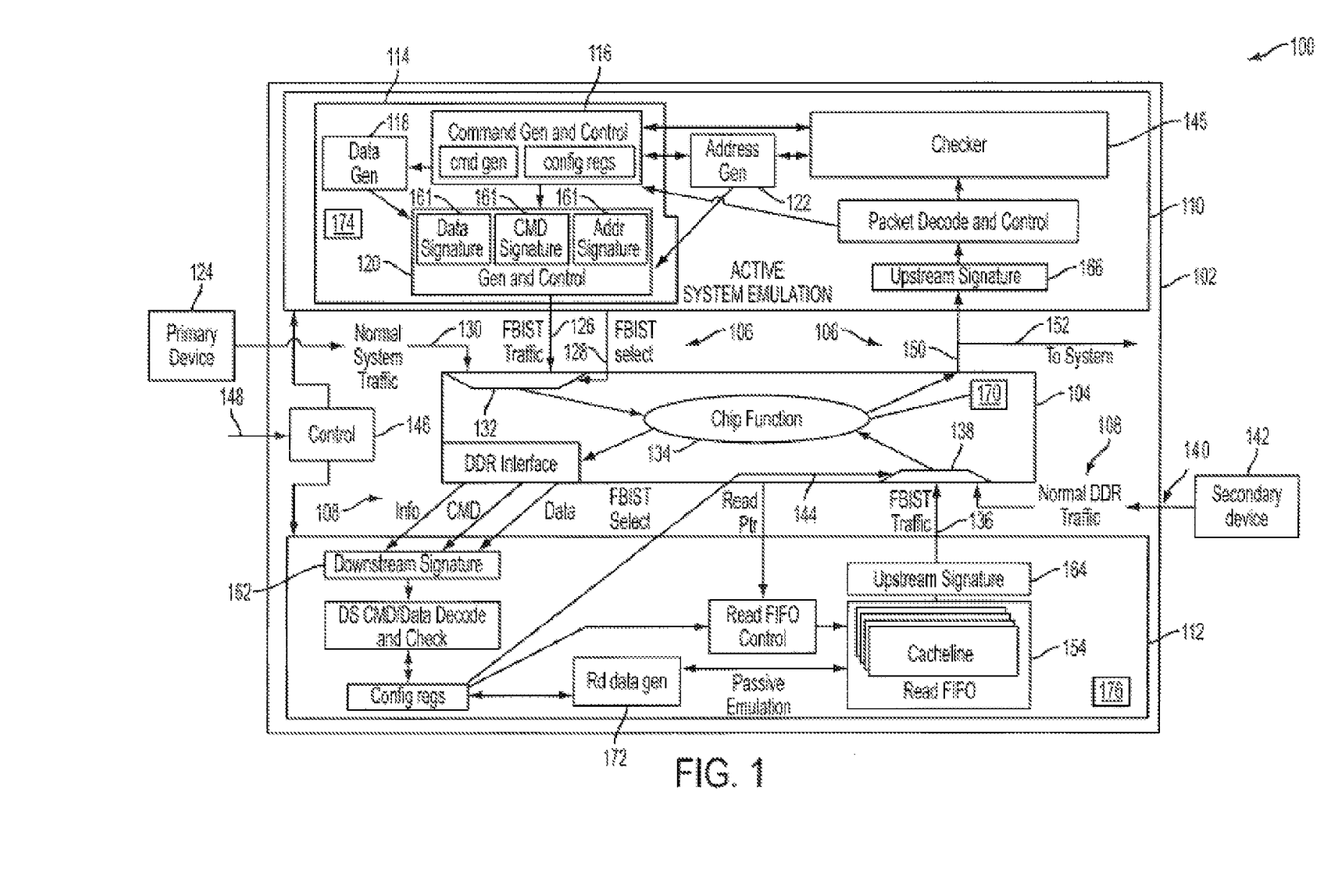
FIG. 1 is a block diagram of an embodiment of a system for functional built-in testing.

FIG. 1 is a block diagram of a FBIST system 100 integrated in a chip 102 according to an embodiment. The chip includes a functional logic module 104 having a primary interface 106 and a secondary interface 108. The FBIST system 100 includes a primary interface testing unit 110 (also referred to as "primary interface emulator") and an emulator engine 112 (also referred to as "secondary interface emulator"), where the emulator engine 112 is configured to test the secondary interface 108. The primary interface testing unit 110 includes an input protocol generator 114 configured to generate a pattern to be inserted into the primary interface 106 of the functional logic module 104. In an embodiment, the input protocol generator 114 includes a command generator 116 that generates a pattern of commands and a data generator 118 that generates a pattern, where the pattern of commands, addresses and/or data are encapsulated in packets by a packet generator 120. The generated patterns of commands and/or data may be user configurable, where target addresses are specified and a combination of read and write commands are included. Packet sizes and run-time attributes may also be included in the patterns, where attributes may specify execution procedures, such as looping or stopping on errors. In an embodiment, an address generator 122 may also be accessed, where addresses used for the commands and data are also encapsulated in the patterns. The patterns are then communicated to the primary interface 106 over multiple data beats. A data beat is transferred on each cycle of the clock or strobe associated with the data.

In an embodiment, the primary interface 106 is configured to couple to a primary device 124, where the primary interface test unit 110 enables testing of the primary interface 106 while the primary device 124 is not attached. The primary interface 106 of the functional logic module 104 includes a traffic line 126 and a select line 128 that are used to send FBIST traffic and enable the FBIST operation. In an embodiment, a primary device traffic line 130 receives normal system traffic for the primary interface 106. A multiplexer 132 receives the line inputs and provides the selected traffic to functional logic 134 in the functional logic module 104, where either test traffic or normal traffic is transmitted to the primary interface 106. In embodiments, the FBIST traffic is a pattern of data and commands as discussed above. The functional logic 134 may then transmit a pattern to the secondary interface 108 based on the received pattern. The emulator engine 112 receives the traffic output from the secondary interface 108, where the emulator engine 112 generates and transmits test traffic based on the received traffic. The emulator engine 112 transmits the test traffic via a traffic line 136 to the functional logic module 104. In an embodiment, a read data FIFO buffer 154 receives generated read data patterns from a read data generator 172 before it is read by the functional logic 134 in the functional logic module 104. The read data is read by the functional logic 134 after a configured amount of time a read command is issued from the chip function 134 in the logic module 104 to the emulator engine 112 through the secondary interface 108. In embodiments, the functional logic module 104 includes on board cache 170. In one embodiment, the traffic line 136 feeds into a multiplexer 138 that is also connected to a secondary device traffic line 140 configured to receive normal traffic from a secondary device 142. The multiplexer 138 also has a select line 144 that enables a switching of traffic between traffic line 136 during FBIST testing and secondary device traffic line 140 during normal operation. The functional logic module 104 and primary interface 106 then generates a response based on the test traffic received from the emulator engine 112 via the secondary interface 108. An output interface payload checker 145 receives the response via read data line 150 and determines if the response is correct. The output interface payload checker 145 is coupled to other components, such as the address generator 122 and input protocol generator 114 and uses information from those components to provide an expected result, where the response is compared to the expected result to verify that the response is correct.

In embodiments, a control unit 146 includes test control logic that controls operation of the FBIST system 100. In one embodiment, a user interface 148 is provided to receive a test configuration for operating the control unit 146 and/or the FBIST system 100. In an embodiment, the control unit 146 maintains coherency for traffic of the primary interface 106 that is divided into multiple parallel execution streams. The test traffic generated by the input protocol generator 114 may include a plurality of commands that are received and divided into multiple parallel execution streams in the functional logic module 104. In such a case, the control unit 146 may arbitrates placement of the commands in the execution streams and may also maintain coherency for the execution streams. In other embodiments, the functional logic module 104 arbitrates placement of the commands in the execution streams. The control unit 146 enables the input interface protocol generator 114 and output interface protocol payload checker 145 to operate independently of the emulator engine 112 while maintaining coherency for the independent operations. In an embodiment, the output interface protocol payload checker 145 determines if the commands were arbitrated and executed correctly in the functional logic module 104. In one embodiment, the control unit 146 uses a protocol, such as Joint Test Action Group (JTAG) protocol to receive information. It should be appreciated that other suitable protocols may also be used such as inter-integrated circuit (I2C). Through the user interface 148 of the control unit 146, the functional logic module 104 and the FBIST logic can receive user direction, chip settings, and test mode configurations. The user interface 148 can also return chip and test status information to external logic or to a system test interface.

In one embodiment, the primary interface and secondary interface 108 each have their own respective control units 174 and 176. In embodiments, the user interface 148 directly accesses configuration and status register blocks in the command generator 116. In an embodiment, the configuration and status register blocks are configured by the user interface 148 to setup and control the FBIST test, and the user interface 148 reads the registers for status, run information, signatures, and other information. There may be communication between the primary control unit 174 and secondary control unit 176, where the information communicated consists of run information, error status, or other information. In an embodiment, the primary interface control unit 174 has overriding power, in that it makes the final decision on whether to start or stop a run when both primary interface testing unit 110 and secondary interface emulator engine are being used.

In an embodiment, the FBIST generated pattern from the input interface protocol generator 114 is injected into the functional logic module 104 via the multiplexer 132 located between the command generator 116 and data generator 118 and the functional logic 134. The select line 128 of the multiplexer 132 determines which data pattern is injected into the cache chip command logic section: normal system traffic (130) or FBIST test traffic (126). The traffic received from the packet generator 120 may include a pattern of write data and commands. In embodiments, a copy of all outgoing data on read data line 150 from functional logic module 104 is sent to output interface protocol payload checker 145 for comparison of all read data. The output interface protocol payload checker 145 may also provide monitoring of outgoing traffic that is communicated via system line 152.

In an embodiment, a signature unit 161 generates a signature when sending traffic into the functional logic module 104. A signature unit 166 also generates a signature when receiving data from the functional logic module 104. In addition, a signature generator 162 on the emulator engine 112 generates a signature for traffic inbound from the functional logic module 104 to the emulator engine 112 while a signature generator 164 generates a signature for traffic outbound to the functional logic module 104 from the emulator engine 112. In embodiments, on both the write command/data bus and read bus of the primary interface 124, the FBIST logic monitors all the signals and computes a signature using a Multiple Input Linear Feedback Shift Register (MILFSR). At the end of a FBIST run, this signature can be compared with the signature from any other identically configured FBIST run on an identically configured chip. The signature will match if the chip is operating correctly.

Embodiments of the FBIST system 100 provide a self contained test for the functional logic module 104 on the chip 102. Further, the testing mechanism allows testing of functions of the function logic module 104 used with a primary interface 106 and a secondary interface 108, where the testing occurs without connections to the primary device 124 or secondary device 142. Accordingly, by providing a comprehensive functional test system that transmits test traffic through the primary interface 106 and through the secondary interface 108 to the emulator engine 112, functionality with respect to primary and secondary devices is verified without assembling the chip 102 into a system. Further, the emulator engine 112 provides return traffic to the functional logic module 104, which, in turn provides the response to the output interface protocol payload checker 145. The response is checked against an expected result by the output interface protocol payload checker 145 to ensure that the functions utilizing the primary and secondary interfaces are executing properly.

In embodiments, the input interface protocol generator 114 provides multiple command streams via traffic line 126 to exercise multiple functional elements of the functional logic module 104 in parallel. The commands may arrive at the functional logic module 104 in a random or user specified order, where the commands are arbitrarily assigned to work queues in the module to allow parallel execution of the functions specified by the commands. The order and organization of command execution may be determined by chip configuration, priorities or other logic built-in to the chip 102. Accordingly, by executing commands in an order that is not predetermined, the output interface protocol payload checker 145 provides verification of the logic that controls the organization of the plurality of commands among workload queues in the functional logic module 104. In embodiments, the logic used to organize the commands and associated work queues is tested and checked by the responses received by the output interface protocol payload checker 145. In one embodiment, there are 32 or more work queues for executing commands in parallel within in the functional logic module 104. Accordingly, the emulator engine 112 receives the output traffic based on the parallel execution, where the engine provides traffic back to the functional logic module 104 and the response by the module is then checked by the output interface protocol payload checker 145, thus ensuring that the parallel execution and organization was correct. Therefore, the FBIST system 100 enables generation of commands and data by the input interface protocol generator 114 and tracks execution of those commands, which is performed in parallel via the functional logic module 104 and emulator engine 112, where responses to the commands are verified to provide an indication that the entire chip is functioning properly with respect to functions interfacing with primary and/or secondary devices.

In embodiments, the FBIST system 100 provides full functional testing of the functional logic module 104 without primary devices 124 and secondary devices 142 attached. The system can test functions, such as read, write, refresh and calibrate, that utilize or interact with the primary interface 106 and secondary interface 108 for accuracy. In addition, the FBIST system 100 tests command timing as the functional logic module 104 responds to commands. In one embodiment, the command timing tested includes back to back read commands and read to write commands. In addition, the system correlates DRAM command execution times to a time when the command arrived to the functional logic module 104 from a computer system including the chip 102. In one embodiment, the emulator engine 112 is used as a DRAM interface monitor during normal system usage. Further, in a system monitoring mode during normal usage, the input interface protocol generator 114 does not inject patterns and the FBIST system 100 monitors command streams and checks timing and execution, as described above.

In an embodiment, the input interface protocol generator 114 generates a large amount of random or pattern based data from a small amount of stored configuration information. In an embodiment of a high speed memory buffer chip with an primary system interface, onboard EDRAM cache and four off chip DRAM interface ports 40 bits of an address are used to select 256, 128 or 64-bytes of data. At any given time, the FBIST logic keep tracks of up to 32 command streams, each with its own address pointer. In this embodiment, FBIST is not limited to working on a particular address space because it stores pattern information within the generated data pattern. Pattern information contains information regarding data pattern and the associated command stream which generated the data. Therefore, when FBIST is configured to test the chip function for proper addressing capability FBIST uses a data equals address pattern which ensures each address location receives a unique data pattern. Other available data patterns may not guarantee proper address logic functionality. In an embodiment, the written data and later the expected read data used by the data checker 145 is generated on the fly (i.e., during runtime) using the encoded data pattern tag and command tag information in conjunction with a small amount of configuration information.

In an embodiment where the functional logic module 104 is a memory controller, the FBIST system 100 provides on-chip DRAM emulation through use of the emulator engine 112 simulates a secondary device to test the secondary interface 108 functionality without the secondary device 142 attached. In one embodiment where the functional logic module 104 is a memory controller, in addition to testing basic read and write functions via the primary interface test unit 110, the functional logic module 104 exercises functions that are used during normal system operation. In embodiments, the functional logic module 104 generates valid DRAM sequences that are transmitted to the emulator engine 112, where the engine responds to the sequences to emulate the unattached DRAM to enable full circle or end-to-end testing of the memory controller functions with respect to the peripheral devices (e.g., secondary device 142). In an embodiment, a plurality of emulator engines 112 are coupled to a plurality of secondary interfaces 108 on the chip 102 and are configured to emulate a variety of peripheral or secondary devices.

In embodiments, the FBIST system 100 can be used to isolate system components during troubleshooting of a system in the field (i.e., in use by a user). The isolation may determine if a failure is caused by a peripheral device or by the chip 102 itself. In one embodiment, the emulator engine 112 may be enabled to receive traffic generated by the functional logic module 104 in response to inputs from the connected primary device 124. Accordingly, the troubleshooting configuration isolates the primary device 124, functional logic module, primary interface 106 and secondary interface, while detaching the secondary device 142 from the system. Alternatively, the secondary interface 108 may be switched to interface with the secondary device 142 while the primary interface 106 receives commands and data from the input interface protocol generator 114. Thus, the FBIST system 100 may be used to provide isolation during testing and troubleshooting of the system while in use.

In an embodiment, the FBIST system 100 is used to test functional logic modules containing on board storage elements including, but not limited to, memory caches comprised of SRAM or embedded DRAM, arrays and first-in first-out (FIFO) buffers without the use of the secondary interface emulator (emulator engine 112). The input protocol generator 114 is employed to generate read or write operations that can access randomly distributed or contiguous addressing regions of memory. In the case of SRAM or embedded DRAM caches consisting of a plurality of physical array elements, FBIST offers advantages over traditional Array Built-In Self Test (ABIST) in that it allows the circuitry to operate at speed while exercising the same directory and data flow used during system operation. Patterns generated by the input protocol generator across the traffic line 126 communicate with the cache, arrays and buffers within the functional logic module 104. To verify functionality, coherency protocol responses and read data, returned on the upstream read data line 150, are compared against expected results by the output payload checker 145.

Figure 2:
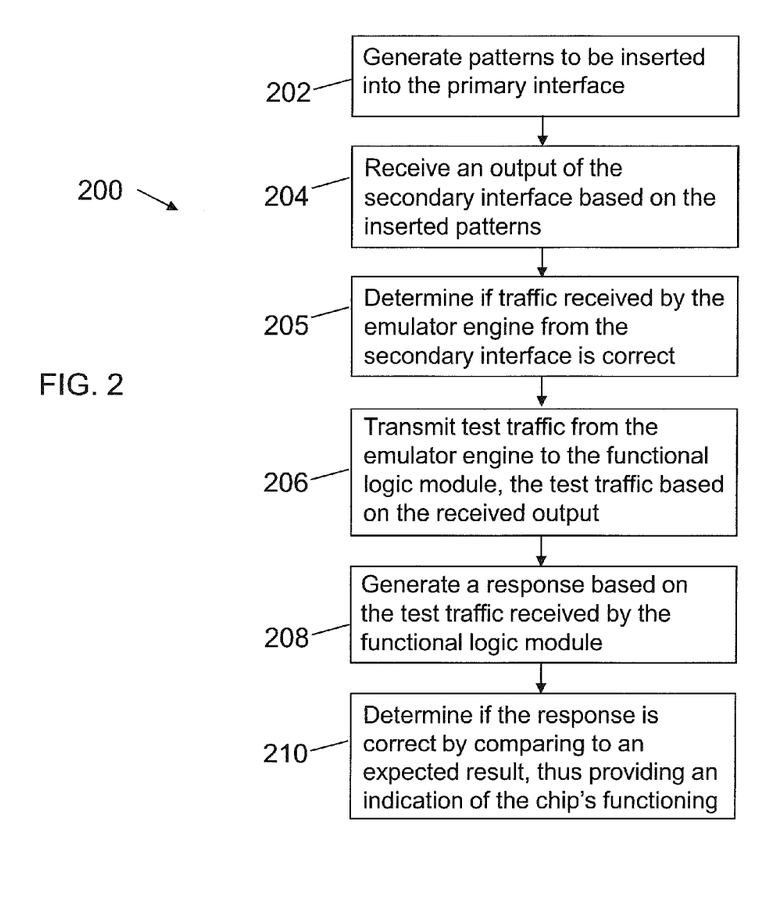
FIG. 2 is a flow chart of an embodiment of a method and system for functional built-in testing.

FIG. 2 is a flow chart 200 illustrating an embodiment of a method and system for functional built-in testing. In embodiments, a chip being tested includes a functional logic module under test, an input interface protocol generator, an output interface protocol payload checker and an emulator engine. A block 202 includes generating patterns, including commands and/or data, to be inserted into the primary interface of a functional logic module. In a block 204, an output of a secondary interface of the functional logic module is received by the emulator engine on the chip. In a block 205, an emulator checker in the emulator engine determines that traffic received by the emulator engine from the secondary interface is correct. In a block 206, test traffic is transmitted from the emulator engine to the functional logic module, where the test traffic is based on an output received by the emulator engine. The emulator engine tests a function of the functional logic module associated with the secondary interface without a secondary device being attached to the secondary interface. In a block 208, the primary interface and functional logic module generate a response based on the test traffic received in the functional logic module from the emulator engine. In a block 210, the output interface protocol payload checker determines if the response is correct by comparing the response to an expected result.

In embodiments the secondary device that is emulated by the emulator engine is a DRAM device, where the functions tested with respect to the DRAM emulator include read, write, refresh and calibration functions. In an embodiment, the primary interface is configured to interface with at least one of a cache unit, a processing unit, a graphics controller, an I/O controller, a memory controller, a redundant array of independent disks (RAID) controller, a Peripheral Component Interconnect Express (PCIe) device and a network adapter.

As discussed above, the FBIST can be used for various testing scenarios that may allow for testing on a wafer in fabrication or in the field to isolate a problem in a system. In an embodiment, the FBIST is used as a stand alone entity with no devices attached to the primary or secondary interface, such as prior to deployment in the field or to eliminate variables during testing. In another embodiment, the FBIST tests the functional logic module with a secondary device coupled to the secondary interface but no device coupled to the primary interface. In yet another embodiment, the FBIST tests the functional logic module with a primary device coupled to the primary interface but no device coupled to the secondary interface. In an embodiment, the FBIST tests the functional logic module with a primary device coupled to the primary interface and a secondary device coupled to the secondary interface. The exemplary embodiment may be used in a situation in the field where some information is provided to indicate the failing scenario, where the FBIST can reproduce the scenario. Accordingly, during troubleshooting the system can switch over to testing via FBIST driving the primary interface (while the whole system is remains together and no disassembly is required) and write targeted test cases to go after the areas of the system that may be the problem. This approach may increase the chances of reproducing the failure, and may provide a controlled environment for debug.

In an embodiment, the FBIST system tests a read function of the functional logic module, where the read function is configured to read data at a selected address of a SRAM device attached to the secondary interface. The input protocol generator generates a pattern including the read operation and selected address, thus emulating a processing unit issuing such a pattern. The pattern is inserted into the functional logic module and processed and/or translated to provide an input to a SRAM device coupled to the secondary interface of the functional logic module, where the input is a communication for the read operation in the memory. In embodiments, the emulator engine receives the input instead of a secondary device, which is not coupled for the test. The emulator engine has a checker that verifies the input is correct by comparing the input to an expected result, which may be provided by the control unit. The emulator engine then provides an output based on the input, where the output includes the data read from the selected address. The output is provided to the functional logic module via the secondary interface, where the functional logic module generates a response based on the output. An output interface payload checker receives the response via the primary interface and checks the response against an expected result.

Figure 3:
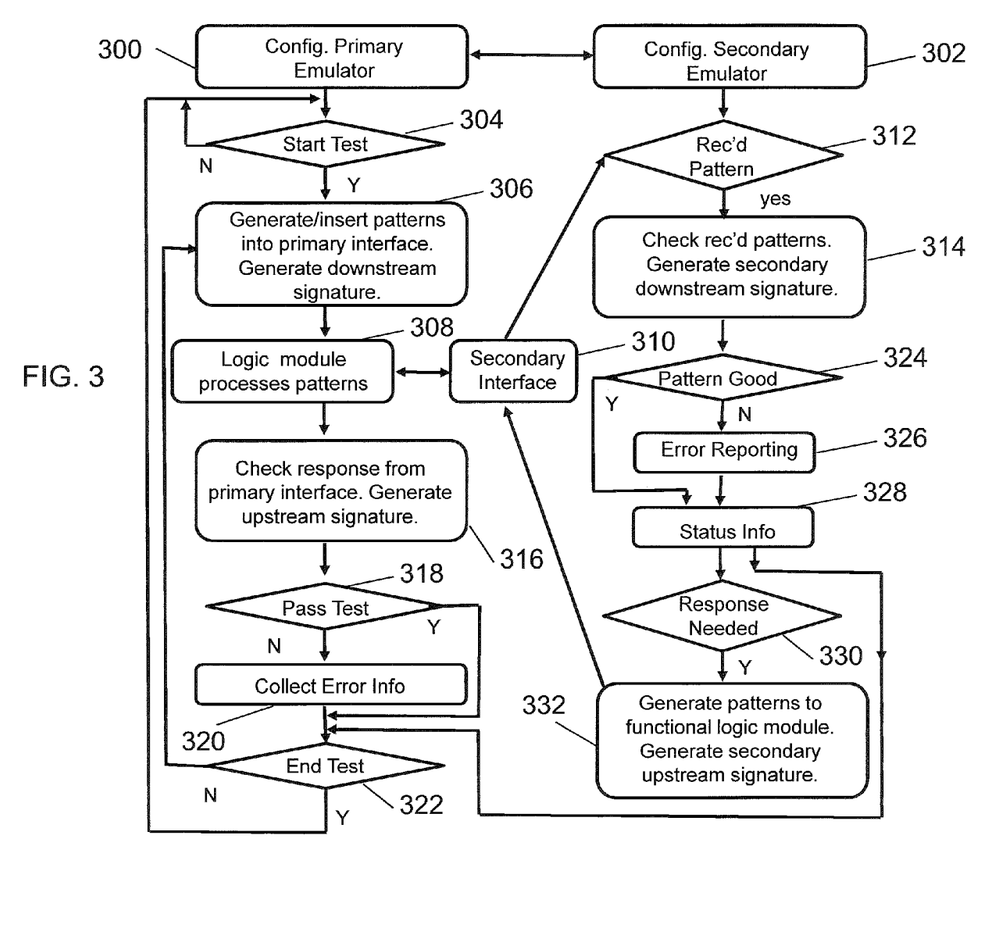
FIGS. 3-5 are flow charts illustrating embodiments of methods and systems for functional built-in testing.

FIG. 3 is a flow chart illustrating an embodiment of a method and system for functional built-in testing, where the arrangement emulates a primary device and a secondary device, where no primary or secondary device is coupled to the system. In a block 300, the primary interface emulator, including the input interface protocol generator and output interface protocol payload checker, is configured. In a block 302, the emulator engine coupled to the secondary interface is configured. In a block 304, a decision whether to start the test is received or verified. In a block 306, patterns are generated to insert into the primary interface and a downstream signature is generated. In a block 308, the functional logic module processes the patterns. The processing may result in traffic sent to a secondary interface in a block 310, where a secondary device is coupled to the interface, or the processing may result in a response directly from the functional logic. In a block 312, a pattern is received by a secondary interface 310 from the functional logic module. In a block 314, the patterns received from the secondary interface are checked by the emulator checker. A secondary downstream signature is also generated and stored. In a block 324, the emulator checker indicates if the pattern has an error. If there is an error, error information is collected and reported in a block 326 and the process advances to a block 330 to determine if a response is needed. In an embodiment, a response may be needed when the function being tested by the FBIST is a read function, where data is read and communicated back to the primary device. In contrast, a write function may not require a response by the emulator engine. If there is no error in block 324, the process advances to block 328 to provide a status of the function execution. The block 328 collects status information on each command processed. The status information is constantly reported to block 322 where a decision is made on whether the run should end, based on the FBIST configuration. After the status is collected in block 328, the process continues to a block 330. In block 330, the process determines if a response is needed to the function. If no response is needed, the iteration of the test is complete. In a block 332, if a response is needed, patterns are generated by the emulator engine and are sent to the functional logic module while a secondary upstream signature is generated and stored.

In a block 316, the output interface emulator receives and checks response patterns received from the primary interface of the functional logic module. An upstream signature is also generated. The generated signatures may be checked by a checker to ensure that patterns with similar signatures were processed similarly and correctly by the system under test. In a block 318, an indication is provided by the primary interface emulator as to whether the system passed. If the test fails, error information is collected in a block 320. If the test passes, the process checks if the testing is complete in a block 320, where the test may return to block 306 if it is not complete. If the test is complete, the process waits for an input to initiate a new test at block 304.

Figure 4:
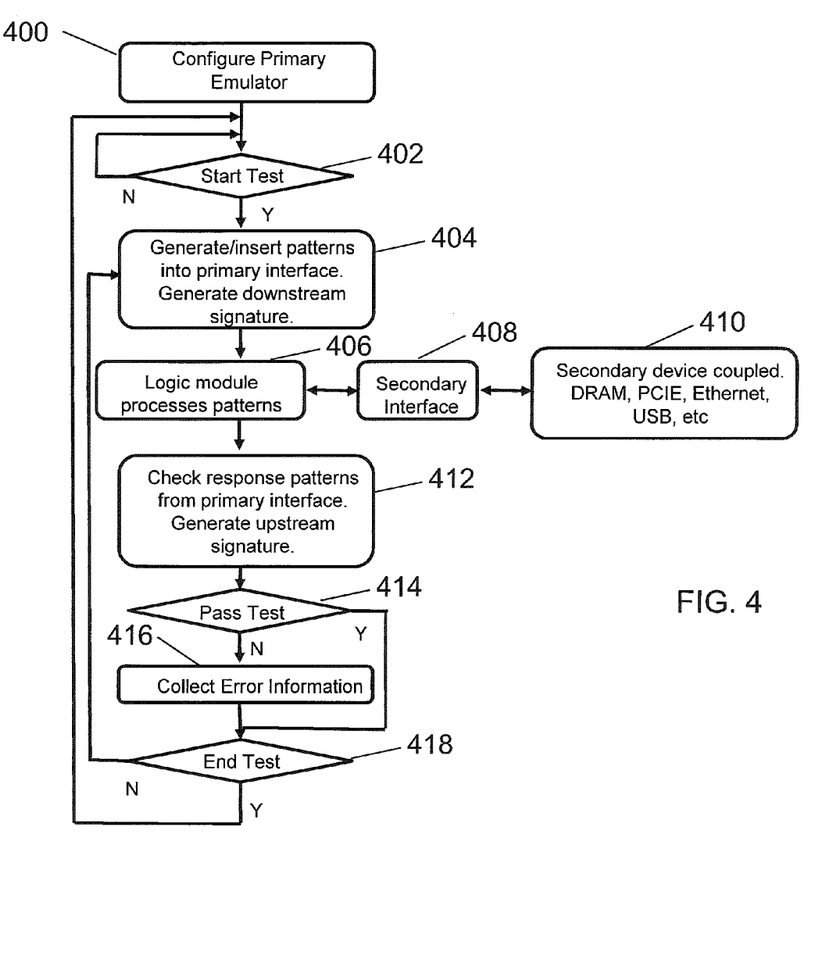

FIG. 4 is a flow chart illustrating an embodiment of a method and system for functional built-in testing, where the arrangement emulates a primary device (where no primary device is coupled) and a secondary device is coupled to the system. In a block 400, the primary interface emulator, including the input interface protocol generator and output interface protocol payload checker, is configured. In a block 402, a decision whether to start the test is received or verified. In a block 404, patterns are generated to insert into the primary interface and a downstream signature is generated. In a block 406, the functional logic module processes the patterns. The processing results in traffic sent to a secondary interface in a block 408, where a secondary device is coupled to the interface, as shown in a block 410. In a block 412, the output interface emulator receives and checks response patterns received from the primary interface of the functional logic module. An upstream signature is also generated. The generated signatures may be checked by a checker to ensure that patterns with similar signatures were processed similarly and correctly by the system under test. In a block 414, an indication is provided by the primary interface emulator as to whether the system passed, where a failure may indicate a problem with the secondary device or the functional logic module. If the test fails, error information is collected in a block 416. If the test passes, the process checks if the testing is complete in a block 418, where the test may return to block 404 if it is not complete. If the test is complete, the process waits for an input to initiate a new test at block 402.

Figure 5:
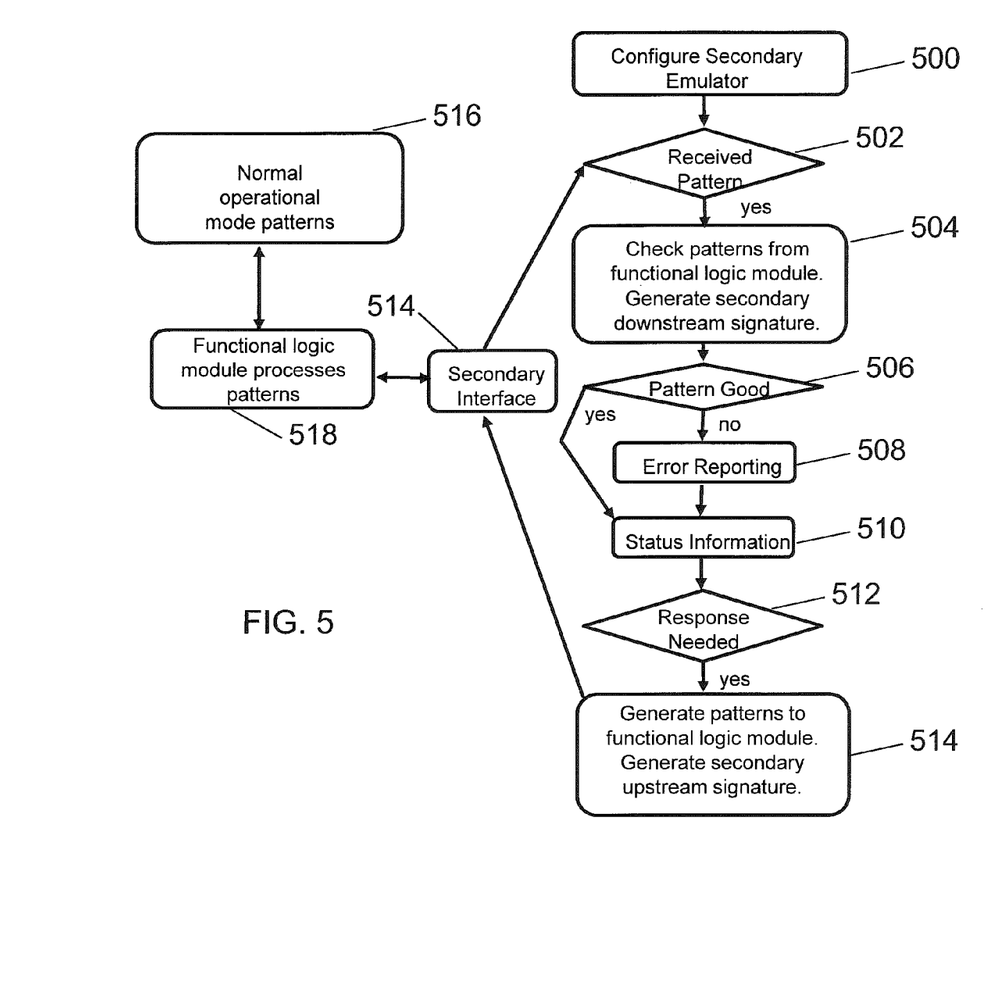

FIG. 5 is a flow chart illustrating an embodiment of a method and system for functional built-in testing, where the arrangement emulates a secondary device (where no secondary device is coupled) and a primary device is coupled to the system. In a block 500, the emulator engine coupled to the secondary interface is configured. In a block 502, a pattern is received by a secondary interface 514 from the functional logic module. The functional logic module receives patterns from normal system use with primary system devices that are attached to the primary interface in a block 516. In a block 518, the functional logic module processes the patterns received via the primary interface and provides the pattern via the secondary interface 514. In a block 504, the patterns received from the secondary interface are checked by the emulator checker. A secondary downstream signature is also generated and stored. In a block 506, the emulator checker indicates if the pattern has an error. If there is no error, the process advances to block 510 to provide a status of the function execution. If there is an error, error information is collected and reported in a block 508 and the process advances to a block 512 to determine if a response is needed. In an embodiment, a response may be needed when the function being tested by the FBIST is a read function, where data is read and communicated back to the primary device. In contrast, a write function may not require a response by the emulator engine. In a block 512, the process determines if a response is needed to the function. In a block 512, if no response is needed, the iteration of the test is complete. In a block 514, if a response is needed, patterns are generated by the emulator engine and are sent to the functional logic module while a secondary upstream signature is generated and stored.

Technical effects and benefits include a system that provides a self-contained fully functional test of a functional logic module of a chip by generating patterns that are received by the module and result in traffic sent to and received from an emulator device. The traffic to and from the emulator device provides testing of functions associated with secondary or passive devices without a secondary device coupled to the chip.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A self-test system integrated on a chip, the chip comprising a functional logic module for performing a selected application, the self-test system comprising:
   a primary interface to the functional logic module, the primary interface configured to selectively interface with a primary device;
   an input interface protocol generator for generating one or more patterns to be inserted into the primary interface;
   a secondary interface to the functional logic module, the secondary interface configured to selectively interface with a secondary device;
   an emulator engine selectively coupled to the secondary interface, wherein the emulator engine is configured to test a function of the functional logic module based on the one or more patterns, the function being configured to test the function of the functional logic module with a switched connection from the secondary device to isolate the primary device and the secondary device, the test function being configured to communicate with the secondary device, wherein the emulator engine tests the function when one or more of the primary device and the secondary device is not coupled to the chip;
   an emulator checker in the emulator engine configured to determine that an input received by the emulator engine from the secondary interface is correct; wherein
      an input generated by the functional logic module is based on the one or more patterns, and
      the emulator engine is further configured to generate an output to the functional logic module based on the input generated by the functional logic module and the testing of the function; and
   an output interface protocol payload checker coupled to the primary interface for determining that a response provided by the functional logic module and received from the primary interface is correct by comparing the response to an expected result, the response provided by the functional logic module based on the output generated by the emulator engine.

2. The system of claim 1, wherein the emulator engine, the input interface protocol generator and the output interface protocol payload checker enable the functional logic module to execute the one or more patterns at a maximum operational frequency.

3. The system of claim 1, wherein the function to communicate with the secondary device comprises a function to be used with a dynamic random-access memory (DRAM) device, the function further comprising at least one of: a read function, a write function, a refresh function and a calibration function.

4. The system of claim 1, wherein the primary interface is configured to interface with at least one selected from the group consisting of: a cache unit, a processing unit, a graphics controller, an I/O controller, a memory controller, a redundant array of independent disks (RAID) controller, a Peripheral Component Interconnect Express (PCIe) device and a network adapter.

5. The system of claim 1, further comprising a control unit configured to:
   maintain coherency for communications of the primary interface divided into multiple parallel execution streams;
   maintain coherency between communications of the primary interface and a primary functional logic;
   select at least one of the one or more patterns to be inserted;
   control duration of operation of the self-test system; and
   enable the input interface protocol generator and output interface protocol payload checker to operate independently of the emulator engine while maintaining coherency.

6. The system of claim 5, further comprising a register accessible by a user-interface for receiving a test configuration for operating the control unit and for receiving user-direction for operating the self-test system.

7. The system of claim 1, wherein the emulator engine tests execution timing of the function to be used with the secondary device.

8. The system of claim 1, wherein the function to be used with the secondary device comprise a function to be used with one selected from the group consisting of: a Peripheral Component Interconnect Express (PCIe) device, a random access memory (RAM) device, a flash memory device, a universal serial bus (USB) and a sensor.

9. The system of claim 1, wherein the input interface protocol generator is further configured to generate a plurality of commands, wherein the functional logic module arbitrates placement of each of the plurality of commands for execution of the plurality of commands in parallel.

10. The system of claim 1, wherein test control logic, the input interface protocol generator, output interface protocol payload checker, emulator engine and emulator checker are configured to test:
    the functional logic module with no secondary devices coupled to the secondary interface and no primary devices coupled to the primary interface;
    the functional logic module with a secondary device coupled to the secondary interface and no primary devices coupled to the primary interface;
    the functional logic module with no secondary devices coupled to the secondary interface and a primary device coupled to the primary interface; and
    the functional logic module with a secondary device coupled to the secondary interface and a primary device coupled to the primary interface.

11. The system of claim 1, further comprising:
    a signature unit on the primary interface for generating a signature when sending communications to the functional logic module and when receiving data from the functional logic module; and
    a signature generator on the emulator engine, wherein the signature generator generates a signature for communications inbound from the functional logic module to the emulator engine and for communications outbound to the functional logic module from the emulator engine.

12. A method for self-testing a functional logic module on a chip, the functional logic module for performing a selected application, the chip selectively comprising a primary interface for the functional logic module, a secondary interface for the functional logic module, an input interface protocol generator coupled to the primary interface, an output interface protocol payload checker coupled to the primary interface and an emulator engine selectively coupled to the secondary interface, the method comprising:

generating, by the input interface protocol generator, one or more patterns to be inserted into the primary interface, wherein the one or more patterns are configured to test a function of the functional logic module that utilize the secondary interface, the testing being with a switched connection from a secondary device to isolate a primary device;

executing, by the functional logic module, the one or more patterns inserted into the primary interface;

receiving, by the emulator engine, an output from the secondary interface based on the one or more patterns executed by the functional logic module;

determining that the output received by the emulator engine from the secondary interface is correct;

transmitting test communications from the emulator engine to the functional logic module via the secondary interface, the test communications being transmitted based on the output received by the emulator engine, the emulator engine selectively operative for testing the function when the secondary device is not coupled to the secondary interface of the functional logic module;

generating, by the functional logic module, a response based on the test communications received by the functional logic module, wherein the response is provided to the primary interface; and determining, by the output interface protocol payload checker, that the response is correct by comparing the response to an expected result.

13. The method of claim 12, wherein the emulator engine, the input interface protocol generator and the output interface protocol payload checker enable the functional logic module to execute the one or more patterns at a maximum operational frequency.

14. The method of claim 12, wherein receiving the output from the secondary interface further comprises receiving an output to test a secondary device function of the functional logic module, the secondary device function comprising at least one of: a read function, a write function, a refresh function and a calibration function.

15. The method of claim 12, wherein generating one or more patterns to be inserted into the primary interface further comprises generating the one or more patterns to be inserted into at least one selected from the group consisting of: a cache unit, a processing unit, a graphics controller, an I/O controller, a memory controller, a RAID controller, a Peripheral Component Interconnect Express (PCIe) device and a network adapter.

16. The method of claim 12, further comprising:
maintaining coherency for communications of the primary interface divided into multiple parallel execution streams;
maintaining coherency between communications of the primary interface and a primary functional logic;
select at least one of the one or more patterns to be inserted;
control a duration of the self-testing; and
enable the input interface protocol generator and output interface protocol payload checker to operate independently of the emulator engine while maintaining coherency.

17. The method of claim 12, further comprising testing execution timing of the function of the functional logic module to be used with the secondary device.

18. The method of claim 12, wherein generating the one or more patterns to be inserted into the primary interface further comprises generating a plurality of commands, wherein the functional logic module arbitrates placement of each of the plurality of commands for execution of the plurality of commands in parallel.

19. A self-test system integrated on a chip, the chip comprising a functional logic module for performing a selected application, the self-test system comprising:

a primary interface to the functional logic module, the primary interface configured to selectively interface with a primary device;

an input interface protocol generator for generating commands to be inserted into the primary interface, wherein the functional logic module arbitrates placement of each of the commands for execution of the commands in parallel;

a secondary interface to the functional logic module, the primary interface configured to selectively interface with a secondary device, the functional logic module generating an input for the secondary interface based on the commands;

an emulator engine selectively coupled to the secondary interface, the emulator engine configured to test the function of the functional logic module with a switched connection from the secondary device to isolate the primary device, the test function being configured to test a function of the functional logic module based on input received from the secondary interface, wherein the emulator engine is further configured to test the function when the secondary device is not coupled to the chip and wherein the emulator engine provides an output to the secondary interface based on testing the function; and an output interface protocol payload checker coupled to the primary interface for determining that a response provided by the functional logic module and received from the primary interface is correct by comparing the response to an expected result, the response provided by the functional logic module based on the output received generated by the emulator engine, wherein the emulator engine, the input interface protocol generator and the output interface protocol payload checker enable the functional logic module to execute the commands at a maximum operational frequency.

20. The system of claim 19, wherein test control logic, the input interface protocol generator, output interface protocol payload checker, and emulator engine are configured to test:
the functional logic module with no secondary devices coupled to the secondary interface and no primary devices coupled to the primary interface;
the functional logic module with a secondary device coupled to the secondary interface and no primary devices coupled to the primary interface;
the functional logic module with no secondary devices coupled to the secondary interface and a primary device coupled to the primary interface; and
the functional logic module with a secondary device coupled to the secondary interface and a primary device coupled to the primary interface.

* * * * *